Aug. 18, 1964  A. J. PYE, SR  3,145,047
DEFLECTOR FOR MOTOR VEHICLES
Filed Aug. 20, 1962

INVENTOR.
ALOYSIUS J. PYE, SR.
BY
Kimmel & Crowell
ATTORNEYS.

3,145,047
DEFLECTOR FOR MOTOR VEHICLES
Aloysius Joseph Pye, Sr., 207 Dyson, Orange, Tex.
Filed Aug. 20, 1962, Ser. No. 217,818
1 Claim. (Cl. 296—91)

This invention relates to a deflector for motor vehicles and has as its primary object the provision of a plate adapted to be mounted in angular relation to and directly in front of the grill of a motor vehicle which will prevent dust, sand, road film, and debris from the road from striking the grill, or the windshield of the vehicle, or marring the paint or finish.

An additional object of the invention is the provision of such a plate which may be readily adjusted in angular relation to the grill in accordance with the speed which the vehicle is traveling by the driver from the dashboard.

A further object of the invention is the provision of a device of this character which will operate to protect the grill, and consequently the motor, from dust, dirt, and other road debris, thus prolonging the life of the oil in the engine of the vehicle, by retaining its cleanliness for longer periods of time.

An additional object of the invention is the provision of a device of this character which may be colored in harmony with the vehicle, and which will serve to enhance the appearance thereof as well as effectively to protect the body, windshield, and grill from foreign matter.

Still other objects reside in the combinations of elements, arrangements of parts, and features of construction, all as will be more fully pointed out hereinafter and disclosed in the accompanying drawing wherein there is shown a preferred embodiment of this inventive concept.

In the drawing.

Similar reference characters refer to similar parts throughout the several views of the drawing.

Figure 1:
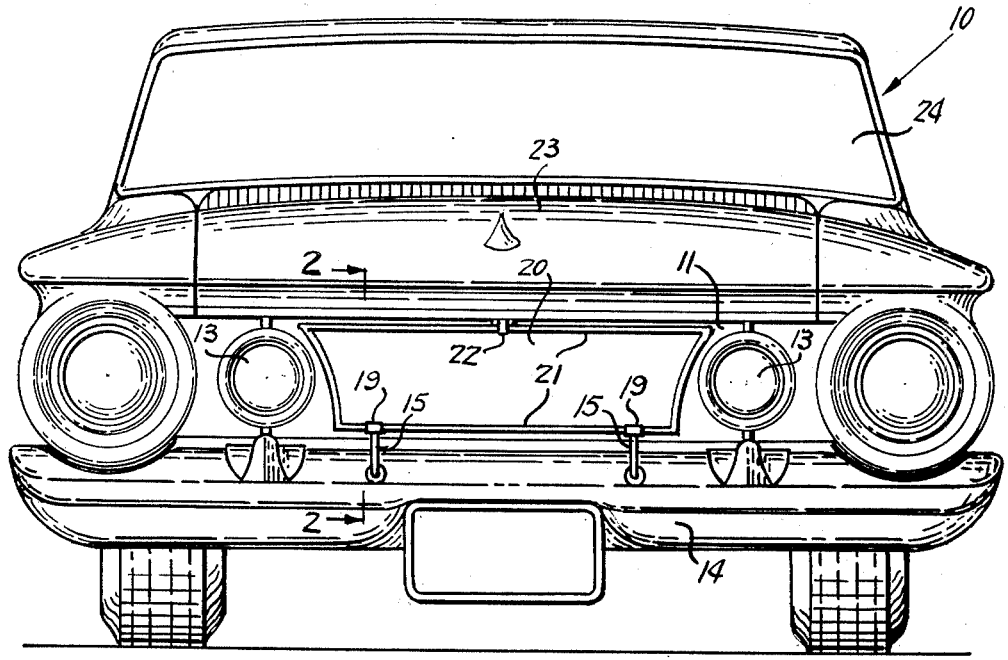
FIGURE 1 is a front elevational view of a motor vehicle showing the deflector of the instant invention applied thereto.
Figure 2:
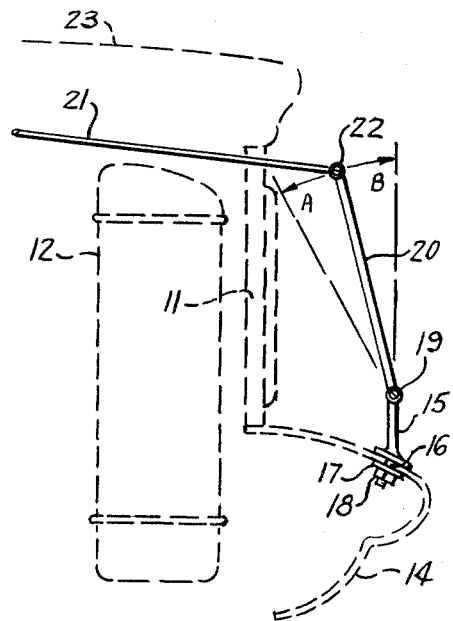
FIGURE 2 is an enlarged sectional view taken substantially along the line 2—2 of FIGURE 1 as viewed in the direction indicated by the arrows.

Having reference now to the drawings in detail, there is generally indicated at 10 a motor vehicle, of any desired conventional type, which is provided with the usual grill 11 for the radiator 12, the grill normally being positioned between headlights 13. A bumper 14 has suitably mounted thereon two or more vertical supports 15, as by means of studs 16 which extend through suitable openings in the bumper 14, and are secured in place by washer 17 and nuts 18.

The upper end of each support 14 includes a ball joint or pivot 19, upon which is mounted the deflector or shield 20 of the instant invention. Deflector 20 may be made in any desired size or shape in accordance with the vehicle upon which it is to be mounted, and is preferably constructed of plastic or light metal, and colored in harmony with the coloring of the vehicle to enhance the ornamental appearance thereof, as well as to serve its prescribed function. The ends of the deflector 20 are cut away arcuately and spaced from the headlights so as not to interfere with the light beams and to permit the entry of air around the ends.

In the illustrative embodiment of the invention shown, the plate is provided with a bead 21 extending about the perimeter thereof for reinforcing purposes, and also to facilitate the attachment of the pivoted ends 19 of supports 15 thereto.

A control rod 21 is pivotally connected as at 22 to the top of the deflector plate, and extends beneath the hood 23 to the dashboard of the vehicle (not shown), but which is in conventional position directly behind the windshield 24 adjacent the driver.

A suitable operating handle (not shown) is applied to the control rod, so that the angle of inclination of the deflector plate may be readily varied. At slow speeds the angle of inclination, which is normally approximately 45° relative to the grill of the car, may be varied, as indicated at B, while at higher speeds the angle may be oppositely varied as indicated at A.

By means of this deflector the vehicle grill is completely protected from any foreign matter such as dust, dirt, debris, or the like on the road, while the car is traveling. The deflector is normally spaced about two inches from the headlights so as not to interfere with night driving and permit the entrance of some air to the grill.

From the foregoing it will now be seen that there is herein provided an improved deflector which is readily adaptable to all types of motor vehicles including trucks as well as passenger vehicles, which accomplishes all the objects of this invention, and others, including many advantages of great practical utility.

As any embodiments may be made of this inventive concept, and as many modifications may be made in the embodiment hereinbefore shown and described, it is to be understood that all matter herein is to be interpreted merely as illustrative.

I claim:

In combination with a motor vehicle having a grill, a bumper, a hood, headlights and a dashboard, a pair of upright supports secured to said bumper, a horizontally extending imperforate plate pivotally mounted on said supports in front of said grill between said headlights and normally inclined at its top toward said grill, said plate having arcuate cutaway ends spaced inwardly from the headlights, a control rod secured to the top of said plate and extending beneath said hood to said dashboard for control by the driver to vary the inclination of said plate, said control rod being pivotally connected to said plate, said plate having a normal angle of inclination of approximately 45° and variable relative to said grill.

References Cited in the file of this patent
UNITED STATES PATENTS

| | | |
|---|---|---|
| 1,392,521 | Pate | Oct. 24, 1921 |
| 2,034,493 | Sonnenberg | Mar. 17, 1936 |
| 2,638,376 | Berry | May 12, 1953 |
| 2,710,772 | Schulein | June 14, 1955 |
| 2,778,439 | Pfingsten | Jan. 22, 1957 |
| 2,783,978 | Baumgarten | Mar. 5, 1957 |
| 2,792,254 | Hagglund | May 14, 1957 |
| 2,868,308 | Biewald | Jan. 13, 1959 |
| 2,872,242 | Whartman et al. | Feb. 3, 1959 |

FOREIGN PATENTS

| | | |
|---|---|---|
| 1,126,263 | Germany | Mar. 22, 1962 |